US009432623B2

(12) United States Patent
Nagase et al.

(10) Patent No.: US 9,432,623 B2
(45) Date of Patent: Aug. 30, 2016

(54) COMMUNICATION TERMINAL, DISPLAY CONTROL METHOD, AND RECORDING MEDIUM

(71) Applicants: Tatsuya Nagase, Kanagawa (JP); Takahiro Asai, Kanagawa (JP)

(72) Inventors: Tatsuya Nagase, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/859,927

(22) Filed: Sep. 21, 2015

(65) Prior Publication Data

US 2016/0088258 A1 Mar. 24, 2016

(30) Foreign Application Priority Data

Sep. 24, 2014 (JP) .................................. 2014-193761
Sep. 16, 2015 (JP) .................................. 2015-183231

(51) Int. Cl.
*H04N 7/14* (2006.01)
*H04N 7/15* (2006.01)
*H04N 5/77* (2006.01)

(52) U.S. Cl.
CPC .................. *H04N 7/15* (2013.01); *H04N 5/77* (2013.01); *H04N 5/772* (2013.01); *H04N 7/147* (2013.01)

(58) Field of Classification Search
CPC ........................................................ H04N 7/14
USPC ..................... 348/14.01, 14.12, 14.13, 14.07
See application file for complete search history.

(56) References Cited

U.S. PATENT DOCUMENTS

| | | | |
|---|---|---|---|
| 2008/0115185 A1* | 5/2008 | Qiu ..................... | H04N 21/2343 725/118 |
| 2012/0081382 A1* | 4/2012 | Lindahl ................... | G06T 11/00 345/581 |
| 2013/0038676 A1 | 2/2013 | Tanaka et al. | |
| 2013/0290993 A1* | 10/2013 | Cheung .............. | H04N 21/4143 725/10 |
| 2014/0118476 A1 | 5/2014 | Nagase et al. | |
| 2014/0253676 A1 | 9/2014 | Nagase et al. | |
| 2015/0058735 A1 | 2/2015 | Nagase et al. | |
| 2015/0109403 A1* | 4/2015 | Krishnan ............... | H04N 7/152 348/14.08 |
| 2015/0249695 A1 | 9/2015 | Nagase et al. | |
| 2015/0249696 A1 | 9/2015 | Nagase | |
| 2015/0264310 A1* | 9/2015 | Krishnaswamy ....... | H04L 65/80 348/14.12 |

FOREIGN PATENT DOCUMENTS

| | | |
|---|---|---|
| JP | 2004-153778 | 5/2004 |
| JP | 2008-227577 | 9/2008 |
| JP | 2011-254453 | 12/2011 |

* cited by examiner

*Primary Examiner* — Olisa Anwah
(74) *Attorney, Agent, or Firm* — Oblon, McClelland, Maier & Neustadt, L.L.P

(57) ABSTRACT

Example embodiments of the present invention include a communication terminal, which controls a display to display a currently set value of quality parameter of content data to be transmitted from the communication terminal to a counterpart communication terminal, transmits a request for changing quality parameter from the currently set value to a value selected by a user to a communication management system through a network, receives an updated charge fee to be charged for transmitting content data having the selected value of quality parameter from the communication management system, and controls a display to display the updated charge fee.

15 Claims, 18 Drawing Sheets

FIG. 7

SERVICE CONTENTS MANAGEMENT TABLE

| SESSION ID | FRAME RATE (fps) | RESOLUTION | MAXIMUM DATA TRANSMISSION RATE (Mbps) | SOUND QUALITY | TERMINAL IP ADDRESS |
|---|---|---|---|---|---|
| se1 | 15 | SD | 1000 | 1 | 1.2.1.3, 1.3.2.4 |
| se2 | 60 | HD | 2000 | 2 | 1.2.1.4, 1.2.2.5 |
| se3 | 30 | SD | 1500 | 3 | 1.2.2.4, 1.3.1.3 |
| ... | ... | ... | ... | ... | ... |

FIG. 8

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 9

TERMINAL MANAGEMENT TABLE

| TERMINAL ID | COUNTERPART TERMINAL NAME | OPERATING STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2014.4.10.13:40 | 1.2.1.3 |
| 01ab | AB TERMINAL, OSAKA OFFICE, JAPAN | OFFLINE | 2014.4.09.12:00 | 1.2.1.4 |
| ... | ... | ... | ... | ... |
| 01ba | BA TERMINAL, BEIJING OFFICE, CHINA | ONLINE (COMMUNICATION OK) | 2014.4.10.13:45 | 1.2.2.3 |
| 01bb | BB TERMINAL, SHANGHAI OFFICE, CHINA | ONLINE (INTERRUPTED) | 2014.4.10.13:50 | 1.2.2.4 |
| ... | ... | ... | ... | ... |
| 01ca | CA TERMINAL, WASHINGTON D.C. OFFICE, U.S. | OFFLINE | 2014.4.10.12:45 | 1.3.1.3 |
| 01cb | CB TERMINAL, NEW YORK OFFICE, U.S. | ONLINE (COMMUNICATING) | 2014.4.10.13:55 | 1.3.1.4 |
| ... | ... | ... | ... | ... |
| 01da | DA TERMINAL, BERLIN OFFICE, EUROPE | ONLINE (COMMUNICATING) | 2014.4.08.12:45 | 1.3.2.3 |
| 01db | DB TERMINAL, LONDON OFFICE, EUROPE | ONLINE (COMMUNICATION OK) | 2014.4.10.12:45 | 1.3.2.4 |
| ... | ... | ... | ... | ... |

FIG. 10

CANDIDATE LIST MANAGEMENT TABLE

| TERMINAL ID OF STARTING TERMINAL | TERMINAL ID OF COUNTERPART TERMINAL |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ··· | ··· |
| 01db | 01aa, 01ab, 01ba, ···, 01da, 01ca, 01cb, ···, 01da |

FIG. 11A

| FRAME RATE (fps) | 15 | 30 | 60 |
|---|---|---|---|
| ADDITIONAL CHARGE (MIN/MON) | 0 | +5 | +10 |

FIG. 11B

| RESOLUTION | SD | HD |
|---|---|---|
| ADDITIONAL CHARGE (MIN/MON) | 0 | +5 |

FIG. 11C

| MAXIMUM DATA TRANSMISSION RATE (Mbps) | 1000 | 1500 | 2000 |
|---|---|---|---|
| ADDITIONAL CHARGE (MIN/MON) | 0 | +5 | +10 |

FIG. 11D

| SOUND QUALITY | 1 | 2 | 3 |
|---|---|---|---|
| ADDITIONAL CHARGE (MIN/MON) | 0 | +5 | +10 |

FIG. 12

| TERMINAL ID | FRAME RATE (fps) | RESOLUTION | MAXIMUM DATA TRANSMISSION RATE (Mbps) | SOUND QUALITY | CHARGE FEE (¥/MIN) |
|---|---|---|---|---|---|
| 01aa | 15 | SD | 1000 | 1 | 50 |
| 01ab | 60 | HD | 2000 | 3 | 85 |
| 01ac | 30 | SD | 1500 | 2 | 65 |
| ... | ... | ... | ... | ... | ... |

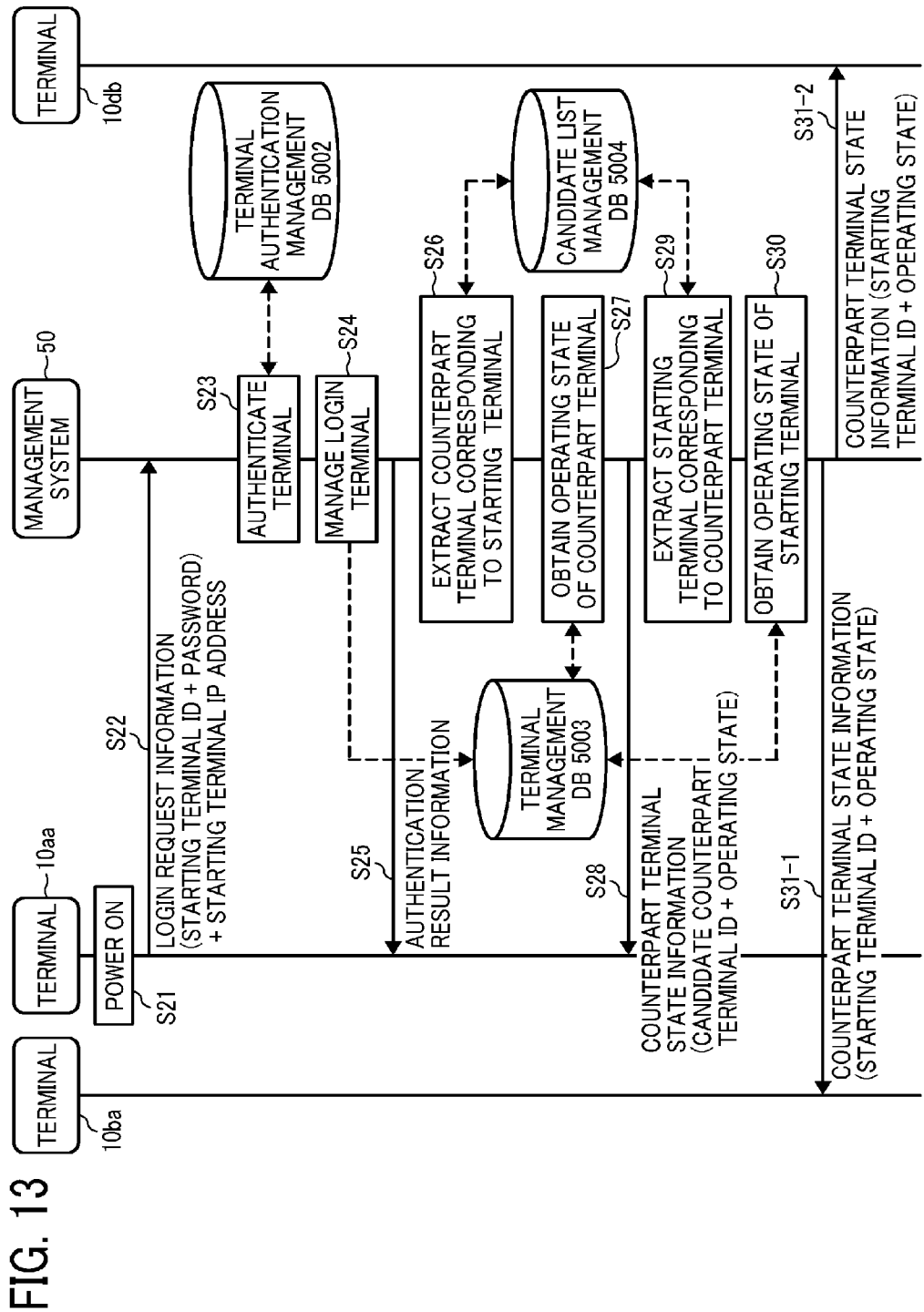

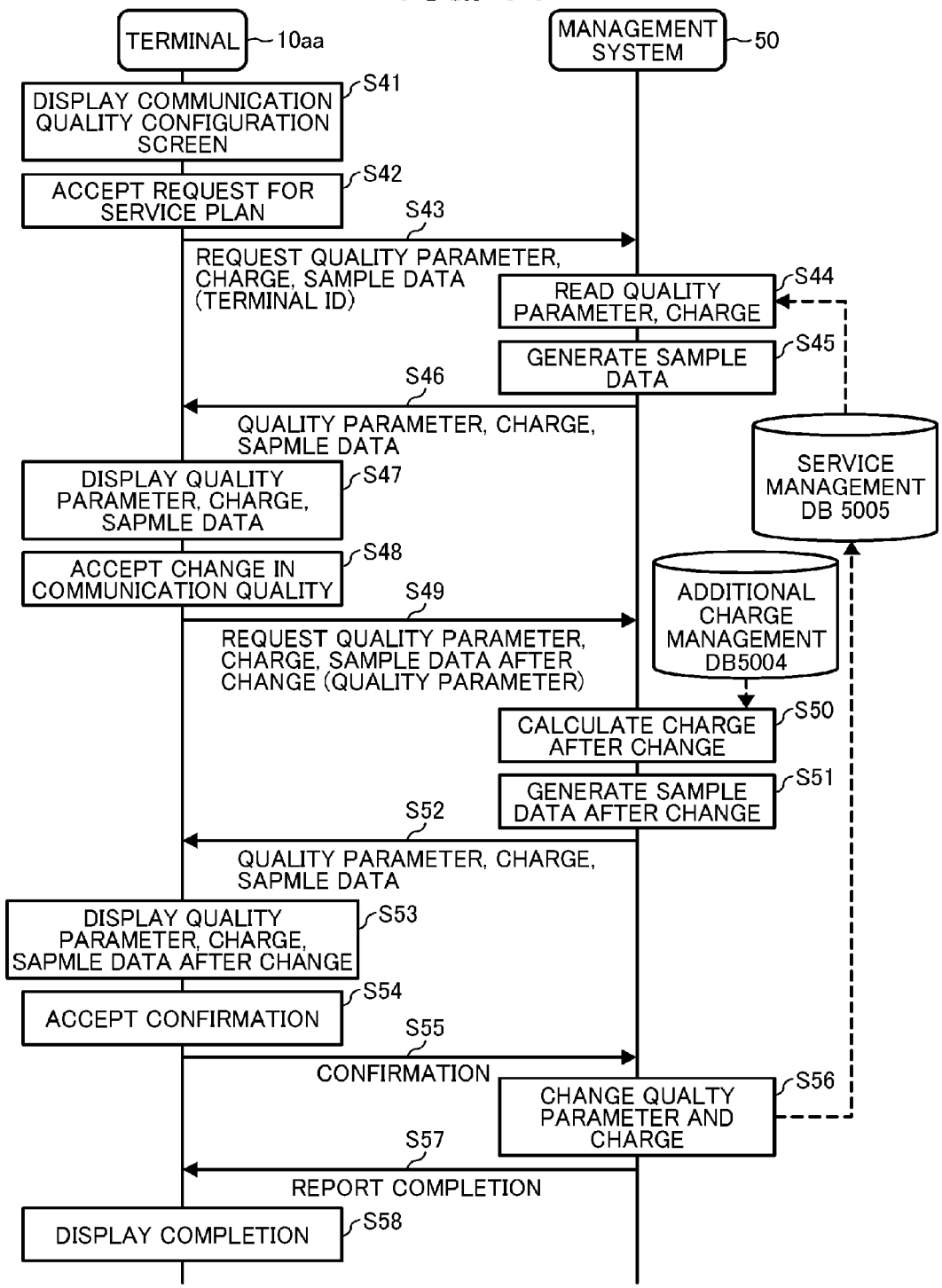

FIG. 17

| IMAGE QUALITY | | | | |
|---|---|---|---|---|
| | FRAME RATE | ■ 15fps | ☐ 30fps | ☐ 60fps |
| | RESOLUTION | ☐ SD | ■ HD | |
| | MAXIMUM DATA TRANSMISSION RATE (Mbps) | ■ 1000Mbps | ☐ 1500Mbps | ☐ 2000Mbps |
| SOUND QUALITY | | | | |
| | SOUND QUALITY | ■ 1 | ☐ 2 | ☐ 3 |

CHARGE FEE  50 Yen/Min ⇨ 55 Yen/Min

SAMPLE IMAGE

CONFIRM CHANGE

CANCEL

FIG. 18

IMAGE QUALITY    CHANGE REFLECTED

| | FRAME RATE | ■ 15fps | ☐ 30fps | ☐ 60fps |
|---|---|---|---|---|
| | RESOLUTION | ☐ SD | ■ HD | |
| | MAXIMUM DATA TRANSMISSION RATE (Mbps) | ■ 1000Mbps | ☐ 1500Mbps | ☐ 2000Mbps |
| SOUND QUALITY | | | | |
| | SOUND QUALITY | ■ 1 | ☐ 2 | ☐ 3 |

CHARGE FEE  50 Yen/Min ⇨ 55 Yen/Min

SAMPLE IMAGE

OK

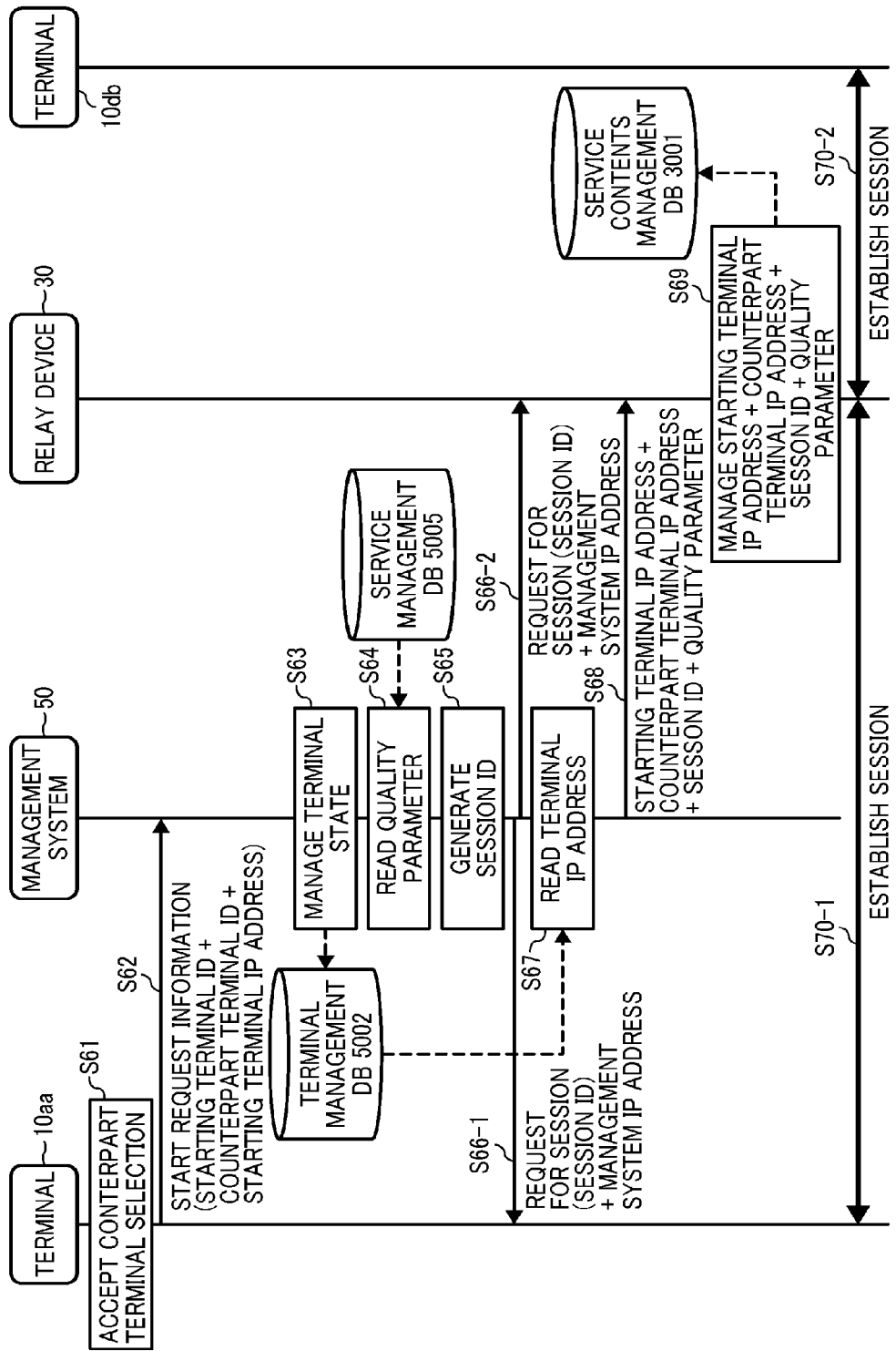

COMMUNICATION TERMINAL, DISPLAY CONTROL METHOD, AND RECORDING MEDIUM

CROSS-REFERENCE TO RELATED APPLICATIONS

This patent application is based on and claims priority pursuant to 35 U.S.C. §119(a) to Japanese Patent Application Nos. 2014-193761 filed on Sep. 24, 2014, and 2015-183231, filed on Sep. 16, 2015, in the Japan Patent Office, the entire disclosure of which is hereby incorporated by reference herein.

BACKGROUND

1. Technical Field

The present invention generally relates to controlling display of information through a communication terminal.

2. Description of the Related Art

An example of a communication system that transmits or receives content data between a plurality of communication terminals via a relay device includes a videoconference system that carries out videoconference via a communication network such as the Internet. There is an increasing need for such videoconference systems as the use of such systems contribute to reduction in business trip costs and time. In such a videoconference system, a plurality of videoconference terminals, which are examples of communication terminals, is used. A videoconference can be carried out by transmission or reception of image data and sound data between these videoconference terminals.

The same communication terminal (or of the same type) may be used for different applications or purposes. For example, in the case of using a communication terminal for remote diagnosis system, an image of the affected part of a patient needs to be sent to a remote place. It is thus preferable that image data be of high quality. In contrast, in the case of using a communication terminal for a videoconference system for merely conveying a message, image data may be of low quality.

The service provider thus offers various service plans to users, for example, by setting a service fee according to the level of communication quality in transmitting image data and/or sound data. The user can choose a specific service plan that can offer a sufficient level of communication quality with a reasonable charge fee to meet the user's need.

SUMMARY

Example embodiments of the present invention include a communication terminal, which controls a display to display a currently set value of quality parameter of content data to be transmitted from the communication terminal to a counterpart communication terminal, transmits a request for changing quality parameter from the currently set value to a value selected by a user to a communication management system through a network, receives an updated charge fee to be charged for transmitting content data having the selected value of quality parameter from the communication management system, and controls a display to display the updated charge fee.

Example embodiments of the present invention include a method of controlling display of information through a communication terminal, including: displaying a currently set value of quality parameter of content data to be transmitted from the communication terminal to a counterpart communication terminal; accepting a user input that requests to change quality parameter from the currently set value to a value selected by a user; receiving an updated charge fee to be charged for transmitting content data having the selected value of quality parameter from a communication management system in response to sending a request for changing the quality parameter; and displaying the updated charge fee.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is an illustration of an example data structure of a service contents management table;

FIG. 8 is an illustration of an example data structure of an authentication management table;

FIG. 9 is an illustration of an example data structure of a terminal management table;

FIG. 10 is an illustration of an example data structure of a candidate list management table;

FIGS. 11A to 11D (FIG. 11) are an illustration of an example data structure of additional fee management tables;

FIG. 12 is an illustration of an example data structure of a service management table;

FIG. 13 is a data sequence diagram illustrating operation of processing a login request from the communication terminal, performed by the management system of FIG. 1, according to an embodiment of the present invention;

FIG. 14 is a data sequence diagram illustrating operation of obtaining image quality parameters and a charge fee each reflecting the change;

FIG. 15 is an illustration of an example communication quality configuration screen;

FIG. 16 is an illustration of an example communication quality configuration screen;

FIG. 17 is an illustration of an example communication quality configuration screen;

FIG. 18 is an illustration of an example communication quality configuration screen;

FIG. 19 is a data sequence diagram illustrating operation of preparing for starting communication, according to an embodiment of the present invention.

Figure 1:
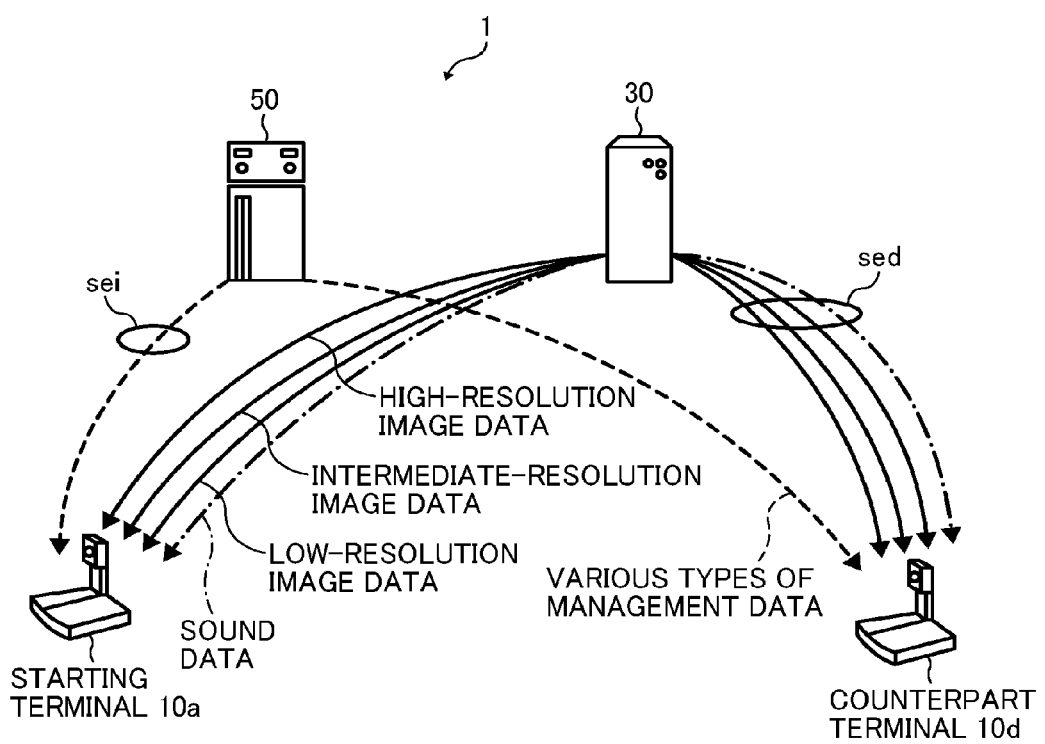
FIG. 1 is a schematic diagram illustrating a part of a communication system relating to videoconference communication, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to the drawings, an embodiment of the present invention is described.

<Configuration of Videoconference System>

Referring to FIG. 1, a communication system 1 for carrying out videoconference among a plurality of communication terminals (10a, 10d) is explained according to the embodiment. FIG. 1 is a schematic diagram illustrating a portion of the communication system 1, which relates to videoconference being carried out between the communication terminals 10a and 10d.

The communication system 1 includes the plurality of communication terminals (10a, 10d), a relay device 30, and a communication management system 50. In the following, any arbitrary one or ones of the plurality of communication terminals (10a, 10d) is or are referred to as the communication terminal 10. The communication terminal 10 transmits or receives image data and sound data as an example of content data. The image data may be a video image or a still image, or both of the video image and the still image.

In this disclosure, the communication terminal that sends a request for starting videoconference is referred to as the "starting terminal", and the communication terminal serving as a request destination (relay destination) of videoconference is referred to as the "counterpart terminal". In FIG. 1, the communication terminal 10a is referred to as the starting terminal, and the communication terminal 10d is referred to as the counterpart terminal. Alternatively, when the communication terminal 10d requests to start videoconference with the communication terminal 10a, the communication terminal 10d is referred to as the starting terminal, and the communication terminal 10a is referred to as the counterpart terminal. Note that the communication terminal 10 may be used not only for communication between different offices or for communication between different rooms in the same office, but also for communication within the same room or for outdoor-indoor communication or outdoor-outdoor communication. In the case where the communication terminal 10 is used outside, wireless communication using a mobile phone communication network or the like is performed.

The relay device 30 relays content data among the plurality of communication terminals 10. The communication management system 50 centrally controls login authentication of the communication terminal 10, management of the communication state of the communication terminal 10, management of a candidate list or the like, and management of the communication state or the like of the relay device 30.

In the communication system 1, a management data session "sei" is established between the starting terminal 10 and the counterpart terminal 10 via the communication management system 50 to transmit or receive various management data therebetween. Between the starting terminal 10 and the counterpart terminal 10, four sessions are established via the relay device 30 to transmit or receive four items of data including high-resolution image data, intermediate-resolution image data, low-resolution image data, and sound data. In FIG. 1, these four sessions are collectively referred to as image and sound data session "sed". The image and sound data session "sed" may not always include four sessions, but any number of sessions greater than or less than four.

Now, resolution of image data to be processed in this embodiment is described. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In addition, in the case of a very wide band path, high-quality image data including low-resolution image data serving as a base image, intermediate-resolution image data, and high-resolution image data is relayed. Since sound data is relatively small in data size, the sound data is relayed even in the case of a narrow band path.

Examples of the communication system 1 include a data providing system that performs one-way transmission of content data from one communication terminal to another communication terminal via a communication management system, and a communication system that intercommunicates information, information reflecting feelings, or the like between a plurality of communication terminals via a communication management system. The communication system is a system for intercommunicating information, information reflecting feelings, or the like between a plurality of communication terminals via a communication management system, and examples thereof include a teleconference system and a videoconference system.

In this embodiment, the communication system, the communication management system, and the communication terminal will be described while assuming a videoconference system serving as an example of the communication system, a videoconference management system serving as an example of the communication management system, and a videoconference terminal serving as an example of the communication terminal. That is, the communication terminal and the communication management system according to the embodiment of the present invention are applied not only to a videoconference system, but also to any desired communication system.

<Hardware Configuration of Communication System>

Figure 2:
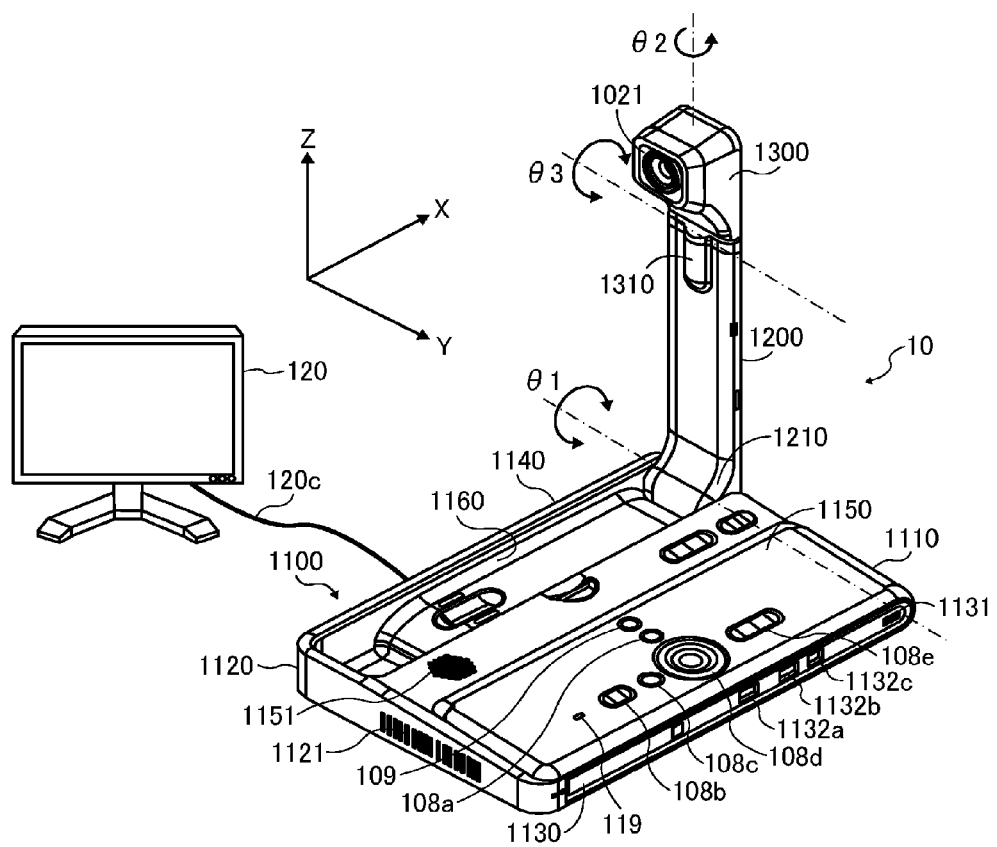
FIG. 2 is a perspective view illustrating an outer appearance of a communication terminal of the communication system of FIG. 1.

Now, a hardware configuration of the communication system 1 is described. FIG. 2 is a perspective view illustrating an outer appearance of the communication terminal 10 of the communication system 1 of FIG. 1. As illustrated in FIG. 2, the communication terminal 10 includes a casing 1100, an arm 1200, and a camera housing 1300. The casing 1100 has a front wall 1110 provided with an inlet face including a plurality of inlet holes, and a back wall 1120 having an exhaust face 1121 on which a plurality of exhaust holes is formed. As a cooling fan included in the casing 1100 is driven, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. The operation panel 1150 further has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later is provided on the right-side wall 1130 of the casing 1100. In contrast, a connection port for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 so as to be rotatable in the vertical direction within the range of a tilt angle $\theta 1$ of 135 degrees with respect to the casing 1100. FIG. 2 illustrates a state in which the tilt angle $\theta 1$ is 90 degrees. The camera housing 1300 has a built-in camera 112 provided thereon, which will be described later, and the camera 112 can capture an image of a user, a document, a room, or the like. The camera housing 1300 is formed with a torque hinge 1310. With the torque hinge, the camera housing 1300 is attached to the arm 1200. The camera housing 1300 is made rotatable in the vertical and horizontal directions within the range of a pan angle $\theta 2$ of ±180 degrees and a tilt angle $\theta 3$ of ±45 degrees with respect to the arm 1200, in which the state illustrated in FIG. 2 serves as 0 degrees.

Note that the external view illustrated in FIG. 2 is only exemplary and the appearance is not restricted thereto. The camera 112 and the microphone 114 need not necessarily be built-in devices and may be external devices. Since the communication management system 50 has the same appearance as that of a general server computer, a description of the appearance thereof is omitted.

Figure 3:
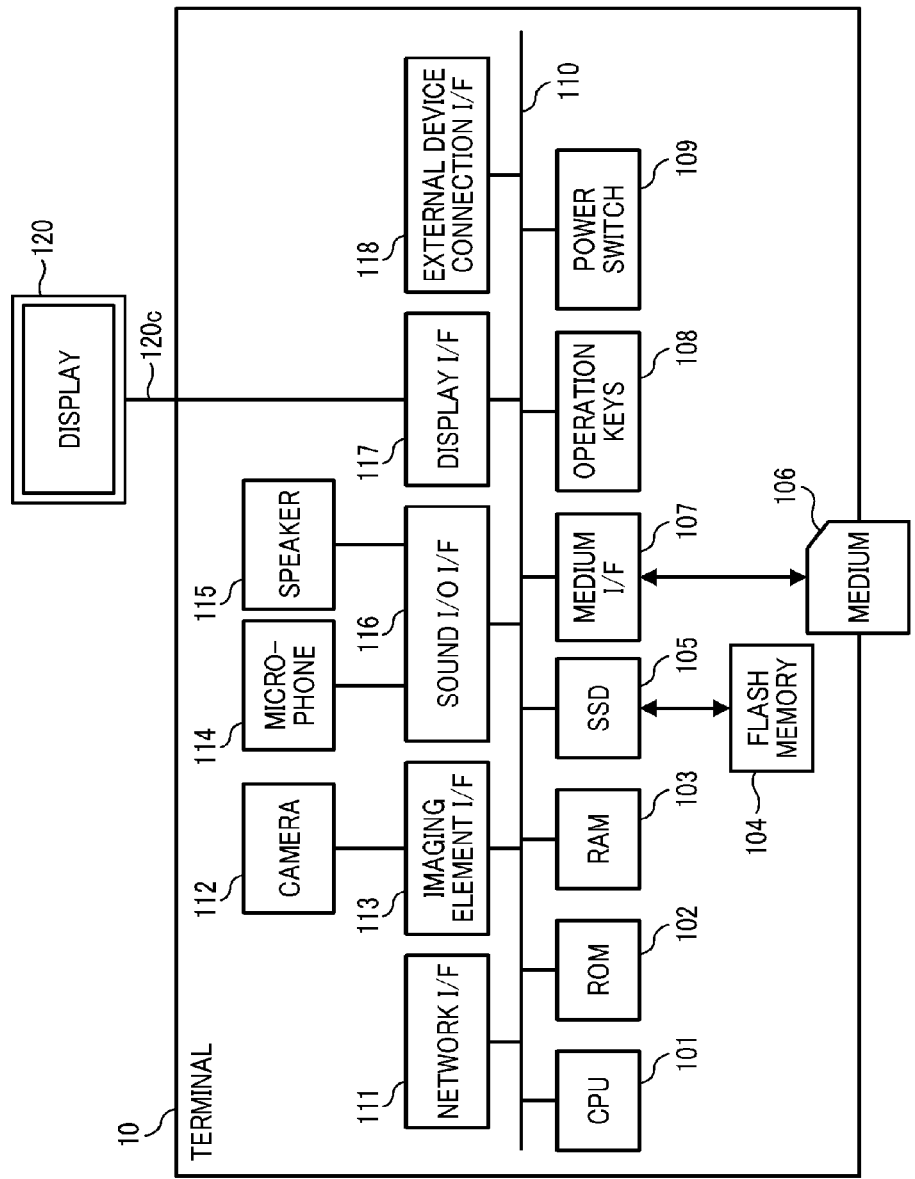
FIG. 3 is a schematic block diagram illustrating a hardware configuration of the communication terminal of FIG. 2.

FIG. 3 is a schematic block diagram illustrating a hardware configuration of the communication terminal 10. As illustrated in FIG. 3, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 that controls reading/writing (storage) of data from/to a recording medium 106, the operation key 108 operated in the case of for example, selecting a counterpart terminal of the communication terminal 10, the power switch 109 for turning on/off the power of the communication terminal 10, and a network interface (I/F) 111 for transmitting data using the communication network 2. In alternative to the SSD, a hard disk drive (HDD) may be used.

In addition, the communication terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead. Further, the terminal control program may be recorded in a file in a format installable or executable on a computer-readable recording medium such as the recording medium 106 for distribution In addition, the terminal control program may be stored on the ROM 102, instead of the flash memory 104.

Figure 4:
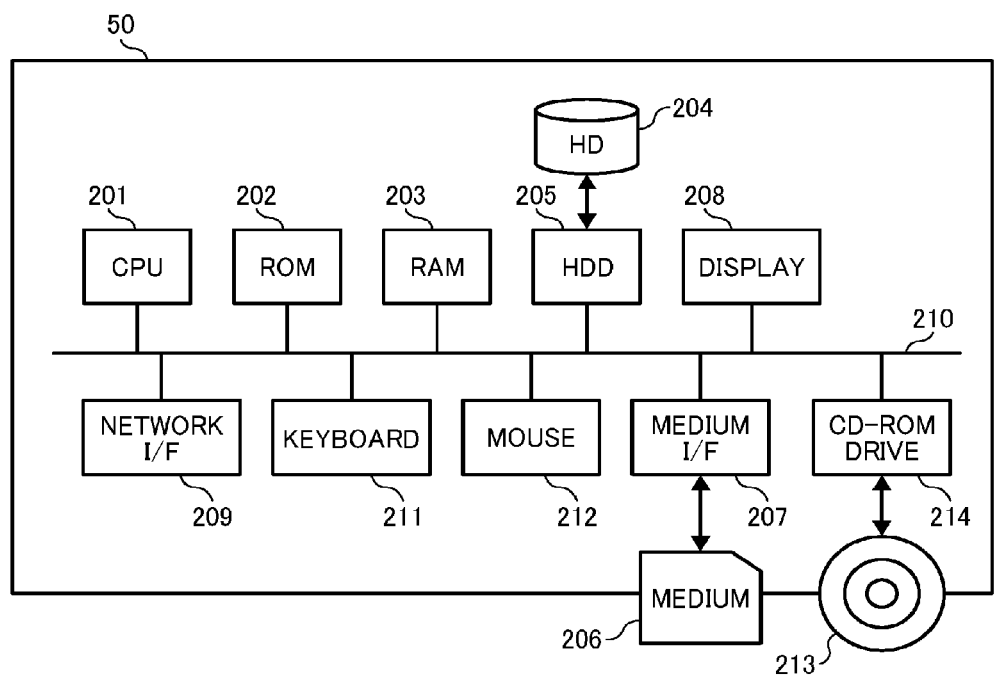
FIG. 4 is a schematic block diagram illustrating a hardware configuration of a communication management system of the communication system of FIG. 1.
Figure 6:
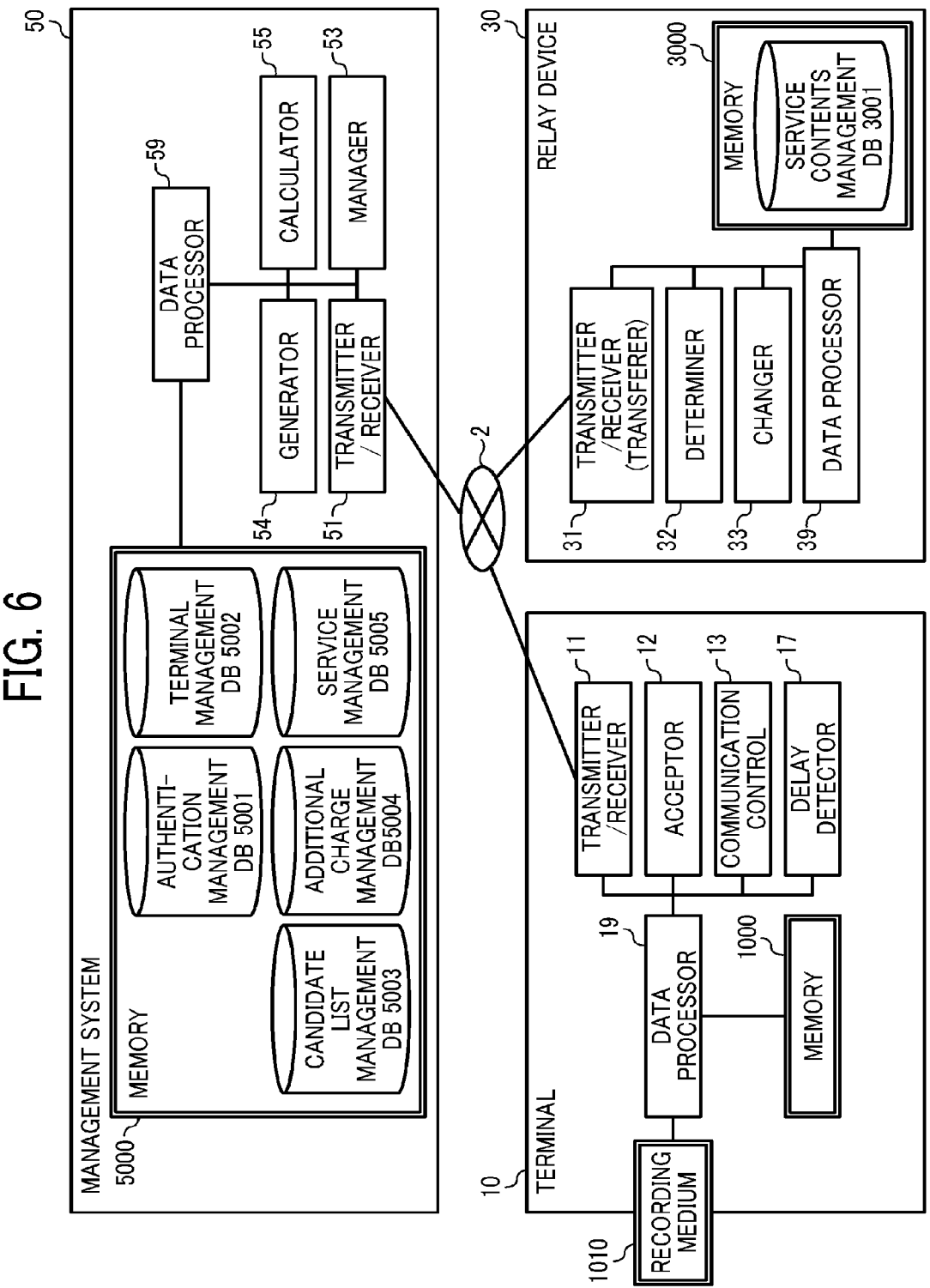
FIG. 6 is a schematic block diagram illustrating a functional configuration of the communication system of FIG. 1 according to an embodiment of the present invention.

FIG. 4 is a diagram illustrating a hardware configuration of the communication management system 50 according to the embodiment. The communication management system 50 includes a CPU 201 that controls entire operation of the communication management system 50, a ROM 202 that stores a program for operating the CPU 201, such as an IPL, a RAM 203 used as a work area for the CPU 201, the HD 204, which stores various types of data, such as the communication management program, a hard disk drive (HDD) 205 that controls reading/writing of various types of data from/to the HD 204 under control of the CPU 201, a medium I/F 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements, as illustrated in FIG. 6.

Note that the communication management program may be recorded in a file in a format installable or executable on a computer-readable recording medium such as the recording medium 206 or the CD-ROM 213 for distribution. In addition, the communication management program may be stored on the ROM 202, instead of the HD 204.

Other examples of the removable recording medium include a computer-readable recording medium such as a compact disc recordable (CD-R), a digital versatile disk (DVD), and a Blue-ray disk.

Since the relay device 30 has a hardware configuration that is the same as or similar to that of the above-described communication management system 50, descriptions thereof are omitted. In case of the relay device 30, the HD 204 stores a relay device control program in alternative to the communication management program.

<Configuration of Communication System>

Figure 5:
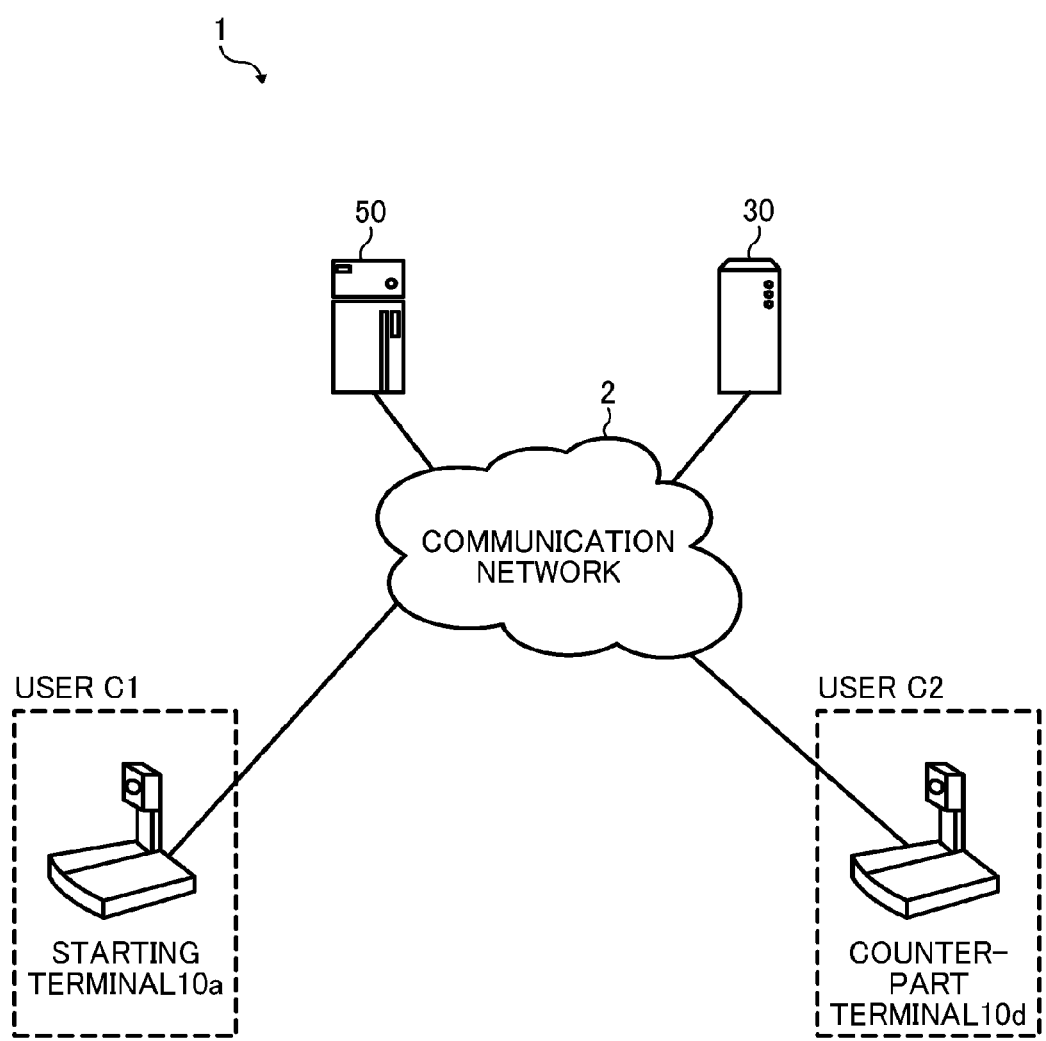
FIG. 5 is a schematic diagram illustrating the communication system of FIG. 1.

Referring now to FIG. 5, a configuration of the communication system 1 is explained according to the embodiment. FIG. 5 is a schematic diagram illustrating the communication system 1 of FIG. 1.

In FIG. 5, the starting terminal 10a, the counterpart terminal 10d, the relay device 30, and the communication management system 50 are connected to the communication network 2 including the Internet. The communication network 2 may include wireless network, in addition to wired network. The communication terminal 10a is operated by a user C1, and the communication terminal 10d is operated by a user C2. The communication management system 50 provides the communication terminal 10 with various services as described below.

<Functional Configuration of Communication System>

Referring now to FIGS. 3, 4, and 6, a functional configuration of the communication system 1 of FIG. 1 is described according to an embodiment of the present invention. FIG. 6 is a schematic block diagram illustrating a functional configuration of the communication system 1 of FIG. 1 according to the embodiment of the present invention.

<Functional Configuration of Terminal>

The terminal 10 includes a transmitter/receiver 11, an acceptor 12, a communication control 13, a display control 17, and a data processor 19. These units are functions that are implemented by operating any of the elements illustrated in FIG. 3 in cooperation with the instructions of the CPU 101 according to the terminal control program expanded from the flash memory 104 to the RAM 103. The terminal 10 further includes a memory 1000 configured by the RAM 103 illustrated in FIG. 3 or the flash memory 104 illustrated in FIG. 3. The terminal 10 is inserted with a recording medium 1010, which may be implemented by the recording medium 106 illustrated in FIG. 3. The data processor 19 reads or writes various data from or to the recording medium 1010.

Referring to FIGS. 3 and 6, a functional configuration of the terminal 10 is explained in detail. In the following description of functional configuration of the terminal 10, relationships of the elements in FIG. 3 with the functional configuration of the terminal 10 in FIG. 6 will also be described.

The transmitter/receiver 11 of the terminal 10 illustrated in FIG. 6, which may be implemented by the instructions of the CPU 101 of FIG. 3, and the network I/F 111 of FIG. 3 transmits or receives various data (or information) to the other terminal, device, or system through the communication network 2. Before starting communication with a desired counterpart terminal, the transmitter/receiver 11 starts receiving state information indicating the state of each candidate counterpart terminal, from the management system 50. The state information not only indicates the operating state of each terminal 10 (whether the terminal 10 is online or offline), but also indicates a detailed state such as whether the terminal 10 whose state is online is now capable of communicating or is currently communicating, or the user of the terminal 10 is not at the terminal 10. In addition, the state information not only indicates the operating state of each terminal 10, but also indicates various states, such as the state that the cable 120c is disconnected from the terminal 10, the state that the terminal 10 can output sounds but not images, or the state that the terminal 10 is muted. Hereinafter, the case in which the state information indicates the operating state will be described by way of example.

The acceptor 12, which is implemented by the instructions of the CPU 101 illustrated in FIG. 3 and by the operation keys 108 and the power switch 109 illustrated in FIG. 3, accepts various inputs from the user. For example, when the user turns on the power switch 109 illustrated in FIG. 3, the acceptor 12 illustrated in FIG. 6 accepts the power on operation and turns on the power.

The communication control 13 is implemented by the instructions of the CPU 101, and any desired device relating to input or output of content data. In one example, the communication control 13 is implemented by the instructions of the CPU 101 illustrated in FIG. 3 and by the camera 112 and the imaging element I/F 113 illustrated in FIG. 3. The communication control 13 captures an image of a subject and outputs image data obtained by capturing the image. In one example, the communication control 13 is implemented by the instructions of the CPU 101 illustrated in FIG. 3 and by the sound input/output I/F 116 illustrated in FIG. 3. After the sound of the user is converted to a sound signal by the microphone 114, the communication control 13 receives sound data according to this sound signal. In another example, the communication control 13 is implemented by the instructions of the CPU 101 illustrated in FIG. 3 and by the sound input/output I/F 116 illustrated in FIG. 3, and outputs the sound signal according to the sound data to the speaker 115, and the speaker 115 outputs sound. The display control 17 is implemented by the instructions of the CPU 101 illustrated in FIG. 3 and by the display I/F 117 illustrated in FIG. 3.

The display control 17 combines images of different resolutions and transmits the combined image to the display 120. The display control 17 also transmits information on a candidate list, received from the management system 50, to the display 120, and controls display of the candidate list on the display 120. The display control 17 of the terminal 10 causes the display 120 to display a screen such as a communication quality configuration screen.

The data processor 19, which may be implemented by the instructions of the CPU 101 illustrated in FIG. 3 and by the SSD 105 illustrated in FIG. 3, or by the instructions of the CPU 101, performs processing to store various types of data in the memory 1000 or the recording medium 1010 or to read various types of data stored in the memory 1000 or the recording medium 1010. The memory 1000 stores a terminal identification (ID) for identifying the terminal 10, a password, and the like. Further, every time image data and sound data are received in performing communication with a counterpart terminal, the memory 1000 overwrites the image data and sound data. The display 120 displays an image based on image data before being overwritten, and the speaker 115 outputs sound based on sound data before being overwritten.

Note that a terminal ID in the embodiment is an example of identification information that is used to uniquely identify a specific terminal 10, such that a language, a character(s), a symbol(s), or various marks are not limited to the above-described embodiment. For example, a combination of at least two of the above-mentioned language, character(s), symbol(s), and various marks may be used as a terminal ID. Instead of a terminal ID, a user ID for identifying the user at the terminal 10 may be used. In such case, terminal identification information includes not only the terminal ID, but also the user ID.

<Functional Configuration of Relay Device>

The relay device 30 includes a transmitter/receiver 31, a determiner 32, a changer 33, and a data processor 39. These units are functions that are implemented by or that are caused to function by operating any of the elements illustrated in FIG. 4 in cooperation with the instructions of the CPU 201 according to the relay device control program expanded from the HD 204 to the RAM 203. The relay device 30 also includes a memory 3000 configured by the RANI 203 illustrated in FIG. 4 and/or the HD 204 illustrated in FIG. 4.

(Service Contents Management Table)

The memory 3000 stores a service contents management database (DB) 3001 configured by a service contents management table such as that illustrated in FIG. 7. The service contents management table of FIG. 7 stores, for each session to be used for communication among the plurality of terminals 10, a session ID for identifying the session, service contents, and IP addresses of the terminals 10 that are communicating through that session in association with one another. As an example of service contents, various quality parameters for controlling operation of the relay device 30 in relaying content data are stored as illustrated in FIG. 7. In this embodiment illustrated in FIG. 7, the quality parameters include an image frame rate (frame per second), an image resolution, and a maximum data transfer speed (mega kilobits per second). More specifically, the quality parameters used in this embodiment are those parameters that affect quality of content data to be received at the terminal 10. As described above, the content data in this embodiment may be image data and/or sound data. The service contents may additionally or alternatively include any other information such as a sampling rate of sound, color depth of image, or encoding format, as the quality parameters affecting the quality of content data. The relay device 30 refers to the service contents management table of FIG. 7 to change, if needed, quality of content data (image data and/or sound data) received from the terminal 10, such that the content data to be transmitted to the counterpart terminal 10 has the quality parameters as defined by the service contents management table of FIG. 7 for a specific session.

(Functional Configuration of Relay Device)

Next, functional configuration of the relay device 30 will be described in detail. In the following description of functional configuration of the relay device 30, relationships of the elements in FIG. 4 with the functional configuration of the relay device 30 in FIG. 6 will also be described.

The transmitter/receiver 31 of the relay device 30 illustrated in FIG. 6, which is implemented by the instructions of the CPU 201 illustrated in FIG. 4 and by the network I/F 209 illustrated in FIG. 4, transmits or receives various types of data (or information) to or from another terminal, device, or system via the communication network 2. The transmitter/receiver 31 also serves as a transferer, which transfers content data transmitted from one terminal 10 to another terminal 10.

The determiner 32, which may be implemented by the instructions of the CPU 201 of FIG. 4, determines whether quality of content data (image data and/or sound data) transmitted from the terminal 10 through a specific session does not exceed the quality as defined by the quality parameters in the table of FIG. 7 for that session.

The changer 33, which may be implemented by the instructions of the CPU 201 of FIG. 4, changes quality parameters of content data (image data and/or sound data), which are to be transmitted from one terminal to another terminal, when the determiner 32 determines that the quality of content data exceeds the quality in the service contents management table (FIG. 7).

The data processor 39, which may be implemented by the instructions of the CPU 201 illustrated in FIG. 4 and the HDD 205 illustrated in FIG. 4, performs processing to store various types of data in the memory 3000 or read various types of data stored in the memory 3000.

<Functional Configuration of Management System>

The management system 50 includes a transmitter/receiver 51, a manager 53, a generator 54, a calculator 55, and a data processor 59. These units are functions that are implemented by or that are caused to function by operating any of the elements illustrated in FIG. 4 in cooperation with the instructions of the CPU 201 according to the communication management program expanded from the HD 204 to the RAM 203. In addition, the management system 50 includes a memory 5000 configured by the HD 204 illustrated in FIG. 4.

(Authentication Management Table)

The memory 5000 stores an authentication management DB 5001 configured by the authentication management table illustrated in FIG. 8. In the authentication management table, for each one of the terminals 10 managed by the management system 50, the terminal ID and the password are stored in association with each other. For example, the authentication management table illustrated in FIG. 8 indicates that the terminal ID of the terminal 10aa is "01aa", and the password of the terminal 10aa is "aaaa".

(Terminal Management Table)

The memory 5000 also stores a terminal management DB 5002 configured by a terminal management table such as that illustrated in FIG. 9. The terminal management table stores, for each one of the terminals 10 managed by the management system 50, the terminal ID of the terminal 10, a counterpart terminal name in the case where the terminal 10 serves as a counterpart terminal, the operating state of the terminal 10, a date/time received at which login request information described later is received at the management system 50, and the IP address of the terminal 10, in association with one another. For example, the terminal management table illustrated in FIG. 9 indicates that the terminal 10aa with the terminal ID "01aa" has the counterpart terminal name "AA terminal, Tokyo office, Japan", the operating state "online (communication OK)", the date/time received at which login request information is received by the management system 50 "Apr. 10, 2014, 13:40", and the IP address 1.2.1.3".

(Candidate List Management Table)

The memory 5000 further stores a candidate list management DB 5003 configured by a candidate list management table such as that illustrated in FIG. 10. The candidate list management table stores, for each one of the terminals 10 managed by the management system 50, the terminal ID of the terminal 10 (starting terminal) that requests to start communication, in association with the terminal IDs of all counterpart terminals 10 registered as candidate counterpart terminals for the terminal 10. For example, the candidate list management table illustrated in FIG. 10 indicates that candidates for a counterpart terminal to which a starting terminal (terminal 10aa) whose terminal ID is "01aa" can send a request to start communication in a videoconference are the terminal 10ab whose terminal ID is "01ab", the terminal 10ba whose terminal ID is "01ba", the terminal 10bb whose terminal ID is "01bb", and so forth. The candidate counterpart terminals are updated by addition or deletion in response to an addition or deletion request received from an arbitrary terminal to the management system 50.

(Additional Fee Management Table)

The memory 5000 stores an additional fee management DB 5004, which may be implemented by a plurality of additional fee management tables of FIGS. 11A to 11D. While this embodiment has a plurality of additional fee management tables, only one additional fee management table may be managed. The additional fee management tables are previously prepared for each of quality parameters managed by the service contents management table of FIG. 7. The table of FIG. 11A stores information regarding the additional fee to be charged as the frame rate increases. The table of FIG. 11B stores information regarding the additional fee to be charged according to a value of the resolution. The table of FIG. 11C stores information regarding the additional fee to be charged according to a value of the maximum data transmission rate. The table of FIG. 11D stores information regarding the additional fee to be charged according to a value of the sound quality level. In this embodiment, the additional charge fees that are calculated for the service quality parameters of FIG. 7 using the tables of FIG. 11 are added to the basic charge fee (50 yen/min) to obtain the total charge fee.

(Service Management Table)

The memory 5000 further stores a service management DB 5005, such as the service management table of FIG. 12. The service management table of FIG. 12 stores, for each terminal 10 managed by the management system 50, the terminal ID, the service contents, and the charge fee in association with one another. Since the service contents (frame rate, resolution, maximum data transmission rate, and sound quality) of FIG. 12 are the same as those managed by the service contents management table of FIG. 7, explanation thereof is omitted. In this example, however, the quality parameters of FIG. 12 indicate the quality of content data used in providing the service to a specific user at the terminal 10. More specifically, the quality parameters of content data differ among the users depending on the service plan of each user. In this embodiment, information indicating the quality parameters of content data is previously stored for each terminal 10 operated by the user, in association with the terminal ID of the terminal 10. The charge fee indicates an amount of fee to be paid by the user of the terminal 10 identified with a specific terminal ID, to a service provider providing the service to the user. The service provider may be an administrator of the management system 50 or a user of the management system 50. The user in this embodiment may be an individual user or a group of users, for example, who belong to the same organization.

In this embodiment, information in the service management table of FIG. 12, such as the quality parameters and the charge fee, is previously set by the service provider for each terminal 10 operated by a specific user. The management system 50 transmits information obtained from the service management table of FIG. 12, to the relay device 30, for example, when requesting to establish a session. Accordingly, the service contents management table of FIG. 7 may be updated to reflect any change in the service management table of FIG. 12, as information to be stored in the service contents management table of FIG. 7 is transmitted from the management system 50.

(Functional Configuration of Management System)

Next, referring to FIGS. 4 and 6, functional configuration of the management system 50 will be described in detail. In the following description of functional configuration of the management system 50, relationships of the elements in FIG. 4 with functional configuration of the management system 50 in FIG. 6 will also be described.

The transmitter/receiver 51, which is implemented by the instructions of the CPU 201 illustrated in FIG. 4 and by the network IN 209 illustrated in FIG. 4, transmits or receives various types of data (or information) to or from another terminal, device, or system via the communication network 2.

The manager 53, which may be implemented by the instructions of the CPU 201 of FIG. 4, updates a record for a specific terminal ID in the service management table (FIG. 12) through the data processor 59, to reflect the quality parameters and the charge fee if such information have been changed.

The generator 54, which may be implemented by the instructions of the CPU 201 of FIG. 4, converts high-quality content data (image data and/or sound data) read out by the data processor 59 from the memory 5000, so as to match the quality parameters as defined in the service management table (FIG. 12), to generate sample data. In this embodiment, it is assumed that the memory 5000 previously stores any content data, such as image data and sound data, as sample data.

The calculator 55, which may be implemented by the instructions of the CPU 201 of FIG. 4, adds the additional fee to the current charge fee, which is determined by the current service plan, to calculate a new charge fee reflecting the change.

The data processor 59, which may be implemented by the instructions of the CPU 201 illustrated in FIG. 4 and the HDD 205 illustrated in FIG. 4, performs processing to store various types of data in the memory 5000 or read various types of data stored in the memory 5000.

<Operation>

Referring to FIGS. 13 to 20, operation performed by the communication system 1 is explained according to an embodiment of the present invention. Referring to FIG. 13, operation of processing a login request received from the terminal 10aa is explained. FIG. 13 is a data sequence diagram illustrating operation of processing the login request received from the terminal 10aa, according to an embodiment of the present invention. In FIG. 13, various management data is transmitted or received through the management data session "sei" in FIG. 1.

When the user of the starting terminal (terminal 10aa) turns on the power switch 109 illustrated in FIG. 2, the acceptor 12 illustrated in FIG. 6 accepts the power on operation and turns on the power (S21). In response to acceptance of the power on operation, the transmitter/receiver 11 automatically transmits login request information indicating a login request to the management system 50 via the communication network 2 (S22). Note that the login request information may be transmitted in response to operation of the operation keys 108 by the user, instead of turning on of the power switch 109. The login request information includes a terminal ID for identifying the terminal 10aa, which is a local terminal serving as a starting terminal, and a password. The terminal ID and the password are data that have been read via the data processor 19 from the memory 1000 and sent to the data transmitter/receiver 11. Alternatively, the terminal ID and the password may be recorded on the recording medium 1010 and may be read out from the recording medium 1010. In the case of transmitting login request information from the terminal 10aa to the management system 50, the management system 50, which is a receiving side, receives the IP address of the terminal 10aa, which is a transmitting side.

Next, the data processor 59 of the management system 50 performs terminal authentication by searching the authentication management table of FIG. 8 using the terminal ID and the password included in the login request information received via the data transmitter/receiver 51 as search keys, and determining whether the same terminal ID and the same password are managed in the authentication management table of FIG. 8 (S23). In the case where the data processor 59 determines that the login request is a login request received from a terminal 10 that has a legitimate use authority since the same terminal ID and the same password are managed, the data processor 59 stores, in the terminal management table of FIG. 9, the terminal ID of the terminal 10aa, the operating state, the date/time received at which the above-described login request information is received, and the IP address of the terminal 10aa in association with one another (S24). Accordingly, the operating state "Online (Communication OK)", the date/time received "4.10.2014.13:40", and the IP address "1.2.1.3" of the terminal 10aa are managed in association with the terminal ID "01aa" in the terminal management table illustrated in FIG. 9.

The data transmitter/receiver 51 of the management system 50 transmits authentication result information indicating an authentication result to the starting terminal (terminal 10aa) which has sent the login request, via the communication network 2 (S25). In the embodiment, the case in which it has been determined that the terminal 10aa is a terminal that has a legitimate use authority will be described as follows.

The data processor 59 of the management system 50 searches the candidate list management table of FIG. 10 using the terminal ID "01aa" of the starting terminal 10aa which has sent the login request as a search key, and reads out to extract the terminal ID of a candidate counterpart terminal that can communicate with the starting terminal 10aa (S26). For the descriptive purposes, it is assumed that the candidates of counterpart terminals 10 for the starting terminal 10aa are the terminals 10ab, 10ba, and 10db.

Next, the data processor 59 searches the terminal management table of FIG. 9 using the extracted terminal IDs ("01ab", "01ba", "01db") of the candidate counterpart terminals, as search keys, to obtain the operating states ("Offline", "Online", and "Online") of the terminals (10ab, 10ba, and 10db) (S27).

Next, the transmitter/receiver 51 transmits counterpart terminal state information including the terminal IDs ("01ab", "01ba", and "01db") serving as the search keys used at S27 described above and the operating states ("Offline", "Online (Communication OK)", and "Online (Communication OK)") of the counterpart terminals (terminals 10ab, 10ba, and 10db) corresponding to these terminal IDs to the starting terminal 10aa via the communication network 2 (S28). The starting terminal 10aa can obtain the current operating states ("Offline", "Online (Communication OK)", and "Online (Communication OK)") of the terminals (10ab, 10ba, and 10db) that are candidates of a counterpart terminal that can communicate with the starting terminal 10aa.

The data processor 59 of the management system 50 further searches the candidate list management table of FIG. 10 using the terminal ID "01aa" of the starting terminal 10aa which has sent the login request as a search key, to extract the terminal ID of another starting terminal that registers the terminal ID "01aa" of the starting terminal 10aa as a candidate counterpart terminal (S29). In the candidate list management table illustrated in FIG. 10, the terminal IDs of other starting terminals that are extracted are "01ab", "01ba", and "01db".

Next, the data processor 59 of the management system 50 searches the terminal management table of FIG. 9 using the terminal ID "01aa" of the starting terminal 10aa which has sent the login request as a search key, and obtains the operating state of the starting terminal 10*aa* (S30).

The transmitter/receiver 51 transmits counterpart terminal state information including the terminal ID "01*aa*" and the operating state "Online (Communication OK)" of the starting terminal 10*aa*, obtained at S30, to terminals (10*ba* and 10*db*) whose operating states are "Online (Communication OK)" in the terminal management table (FIG. 9), among the terminals (10*ab*, 10*ba*, and 10*db*) having to the terminal IDs ("01*ab*", "01*ba*", and "01 db") extracted at S29 (S31-1 and S31-2). When transmitting the counterpart terminal state information to the terminals (10*ba* and 10*db*), the transmitter/receiver 51 refers to the IP addresses of the terminals, which are managed in the terminal management table illustrated in FIG. 9, using the terminal IDs ("01*ba*" and "01*db*"). Accordingly, the terminal ID "01*aa*" and the operating state "online" of the starting terminal (terminal 10*aa*) which has sent the login request can be transmitted to other counterpart terminals (terminals 10*ba* and 10*db*) that can communicate with the starting terminal (terminal 10*aa*).

For any other terminal 10, as described above referring to S21, when the user turns on the power switch 109 illustrated in FIG. 2, the acceptor 12 illustrated in FIG. 6 accepts the power on operation and performs processing that is the same as or similar to the above-described S22 to S31-1 and S31-2, such that descriptions of which are omitted.

Referring now to FIGS. 14 to 18, operation of obtaining a new charge fee and sample data that reflect changed quality parameters is explained according to an embodiment of the present invention. FIG. 14 is a data sequence diagram illustrating operation of obtaining quality parameters and a charge fee each reflecting the change in quality parameters, according to an embodiment of the present invention. FIGS. 15 to 18 illustrate example screens to be displayed when configuring communication quality in providing content data as a service. In the screen of any one of FIGS. 16 to 18, information regarding the quality parameters, charge fee, and sample image are displayed together. If sample content data includes sample sound data, such sample sound data is output through the speaker 115.

Referring to FIG. 14, the display control 17 of the terminal 10*aa* causes the display 120 to display a communication quality configuration screen (S41). For example, the communication quality configuration screen of FIG. 15 may be displayed, which displays various items such as the quality parameters (image quality, sound quality), charge fee, and sample image. In this screen of FIG. 15, the value for each item, which is determined by the service plan of the user, is not displayed. The screen of FIG. 15 also displays the "request for service plan" key to be selected when requesting display of detailed contents of the current service, and the "cancel" key to be selected when closing the screen. As the user at the terminal 10*aa* selects the "request for service plan" key, the acceptor 12 accepts the request for displaying the contents of the current service provided to the user (S42). The transmitter/receiver 11 of the management system 50 transmits a request for the quality parameters, charge fee, and sample data of the current service to the management system 50 (S43). The terminal 10*aa* also transmits the terminal ID of the terminal 10*aa* to the management system 50. The transmitter/receiver 51 of the management system 50 receives the request for the quality parameters, charge fee, and sample data, as well as the terminal ID of the terminal 10*aa*.

Next, the data processor 59 of the management system 50 searches the service management table (FIG. 12) using the terminal ID received at S43 as a search key to obtain the quality parameters and the charge fee that are associated with the terminal ID (S44). The generator 54 converts the quality parameters (such as the image quality parameter and/or the sound quality parameter) of sample content data (image data and/or sound data), read out by the data processor 59 from the memory 5000, to match the quality parameters read at S44, to generate sample data for the terminal 10*aa* (S45).

The transmitter/receiver 51 transmits, to the terminal 10*aa*, the quality parameters and the charge fee that are read at S44, and the sample data generated at S45 (S46). The transmitter/receiver 11 of the terminal 10*aa* receives information regarding the quality parameters and charge fee, and sample data.

The display control 17 of the terminal 10*aa* causes the display 120 to display the quality parameters, charge fee, and sample data (S47). For example, the communication quality configuration screen of FIG. 16 may be displayed, which include information regarding the received quality parameters and charge fee, and an image of sample data. The screen of FIG. 16 further displays the "request change" key to be selected when requesting change in quality parameter, and the "cancel" key to be selected when closing the screen of FIG. 16.

In this embodiment, it is assumed that the user at the terminal 10*aa* operates the operation key 108 to change the resolution from "SD" to "HD", and selects the "request change" key. In such case, the acceptor 12 accepts the request for changing the communication quality (S48). The transmitter/receiver 11 of the terminal 10*aa* requests the management system 50 for information regarding the quality parameters and charge fee that reflect the change, as well as sample data reflecting the change (S49). Further, at S49, the transmitter/receiver 11 transmits the change in quality parameters that is accepted at S48 to the management system 50. The transmitter/receiver 51 receives the request for the quality parameters, charge fee, and sample data that reflect the change, and the change in quality parameters.

The calculator 55 refers to the additional fee management table (FIG. 11) using the changed quality parameter that is received at S49 to calculate a new charge fee reflecting the change in quality (S50). More specifically, the data processor 59 searches the additional fee management table of FIG. 11B using the changed quality parameter (in this example, changing the resolution to "HD") that is received at S49 as a search key to obtain the additional fee for transmitting content data having the resolution value "HD". The calculator 55 adds the obtained additional fee, as well as the additional fees for the other quality parameters, to the basic charge fee of the user at the terminal 10*aa* to calculate the new charge fee. Alternatively, the difference in additional fee due to the change in quality parameter value may be added to (or subtracted from) the currently set charge fee for the user at the terminal 10*aa*.

The generator 54 converts quality parameters of sample content data (image data and/or sound data) read out by the data processor 59 from the memory 5000, to match the quality parameters reflecting the change to obtain sample data reflecting the change (S51).

The transmitter/receiver 51 transmits, to the terminal 10*aa*, the quality parameters reflecting the changed quality received at S49, the charge fee calculated at S50, and the sample data generated at S51 (S52). The transmitter/receiver 11 of the terminal 10*aa* receives the quality parameters, charge fee, and sample data each reflecting the change in quality.

The display control 17 of the terminal 10aa causes the display 120 to display quality parameters, charge fee, and sample data each reflecting the change (S53). For example, the communication quality configuration screen of FIG. 17 may be displayed, which includes the quality parameters, charge fee, and sample image each of which reflects the change, in addition to the charge fee and sample image reflecting the unchanged quality (that is, information reflecting the current service plan). The screen of FIG. 17 further includes the "confirm change" key to be selected when accepting the change in quality, and the "cancel" key to be selected when canceling the change in quality. The user at the terminal 10aa is able to compare between the sample image before the change, and the sample image after the change, to determine whether it is worthwhile to change the quality parameters with the additional fee. In this embodiment, the sample image is video image data. Alternatively, sounds may be generated based on sample sound data for output, such that the user can hear the sample sounds. Alternatively, the sample image may be a still image.

For example, a type of content data to be used for sample data may be determined based on specific parameters that are requested to be changed. In such case, in response to the request for changing specific parameters, the generator 54 may determine a type of content data to be generated based on a type of specific parameters to be changed. For example, if the user requests to change the resolution, the quality of image data after change can be checked with a still image. In such case, the generator 54 may generate still image data that reflects the changed values of resolution as sample content data. Similarly, if the user requests to change only the parameter that affects the sounds, the generator 54 may generate sound data that reflects the changed values of sound quality parameter, as sample content data. By selecting a type of content data for display based on a type of parameter to be changed, in case sound data or still image data is only needed to show the difference, the load on network can be reduced as still image data or sound data usually is less in data size.

When the user at the terminal 10aa presses the "confirm change" key with the operation key 108, for example, the acceptor 12 accepts confirmation of the change in quality (S54). The transmitter/receiver 11 transmits confirmation of changing the quality to the management system 50 (S55). The transmitter/receiver 51 of the management system 50 receives the confirmation of changing the quality.

The manager 53 of the management system 50 causes the data processor 59 to change a record for the terminal ID "01aa" in the service management table (FIG. 12) to reflect the changed quality parameters and the new charge fee (S56). The transmitter/receiver 51 transmits information indicating that the change is complete to the terminal 10aa (S57). The transmitter/receiver 11 of the terminal 10aa receives the information indicating completion of the change.

The display control 17 of the terminal 10aa causes the display 120 to display a message indicating that the change in quality is completed (S58). For example, the communication quality configuration screen of FIG. 18 may be displayed, which additionally includes the message "change reflected" at the upper side of the screen. The screen of FIG. 18 further includes the "OK" key at the lower right. As the user at the terminal 10aa presses the "OK" key, operation of changing the quality parameters of content data ends.

Referring now to FIG. 19, operation of preparing for starting communication is described according to an embodiment of the present invention. FIG. 19 is a data sequence diagram illustrating operation of preparing for starting communication.

First, when the user at the starting terminal 10aa presses the operation keys 108 illustrated in FIG. 2 and selects the terminal 10db, the acceptor 12 illustrated in FIG. 6 accepts a request for starting communication with the counterpart terminal 10db (S61). The transmitter/receiver 11 of the starting terminal 10aa transmits, to the management system 50, start request information indicating a request for starting communication with the counterpart terminal 10db (S62). The start request information includes the terminal ID "01aa" of the starting terminal 10aa, and the terminal ID "01db" of the counterpart terminal 10db. The transmitter/receiver 51 of the management system 50 obtains the start request information, and further receives the IP address of the starting terminal 10aa, which is the transmission source.

The manager 53, which obtains the terminal ID "01aa" of the starting terminal 10aa and the terminal ID "01db" of the counterpart terminal 10db from the start request information, changes the operating state field of each of records including the above-mentioned terminal IDs "01aa" and "01db" to "Online (Communicating)" in the terminal management table of FIG. 9 (S63). In this state, although the starting terminal 10aa and the counterpart terminal 10db have not started communicating, these terminals enter a communicating state, and, if another terminal 10 tries to communicate with the starting terminal 10aa or the counterpart terminal 10db, a notification sound or display that indicates that the terminal is communicating is output.

The data processor 59 searches the service management table (FIG. 12) using the terminal ID "01aa" of the starting terminal 10 as a search key to obtain the quality parameters of service contents for the terminal 10aa (S64). The manager 53 generates a session ID (S65).

The transmitter/receiver 51 transmits a request for establishing a session ("request for session") to the starting terminal 10aa (S66-1). The session establishing request includes the session ID generated at S65. The transmitter/receiver 11 of the starting terminal 10aa receives the session establishing request and the IP address of the management system 50. The transmitter/receiver 51 of the management system 50 further transmits the session establishing request to the counterpart terminal 10db (S66-2). The session establishing request includes the session ID generated at S65. The transmitter/receiver 11 of the counterpart terminal 10db receives the session establishing request and the IP address of the management system 50.

Next, the data processor 59 of the management system 50 searches the terminal management table (FIG. 9) using the terminal IDs of the starting terminal 10aa and the counterpart terminal 10db, received at S62, as search keys, to read corresponding IP addresses (S67).

The transmitter/receiver 51 of the management system 50 transmits the IP addresses of the starting terminal 10aa and the counterpart terminal 10db that are read at S67, the quality parameters read at S64, and the session ID generated at S65, to the relay device 30 (S68). The transmitter/receiver 31 of the relay device 30 receives the IP addresses of the starting terminal 10aa and the counterpart terminal 10db, the quality parameters read at S64, and the session ID generated at S65.

Next, the data processor 39 of the relay device 30 newly stores the session ID, the quality parameters, and the IP addresses of the terminals 10, in association with each other in the service contents management table (see FIG. 7) (S69). The transmitter/receiver 31 of the relay device 30 establishes a communication session with the starting terminal 10*aa* using the session ID and the IP address of the starting terminal 10*aa* stored at S69 (S70-1). The transmitter/receiver 31 of the relay device 30 establishes a communication session with the counterpart terminal 10*db* using the session ID and the IP address of the counterpart terminal 10*db* stored at S69 (S70-2).

Figure 20:
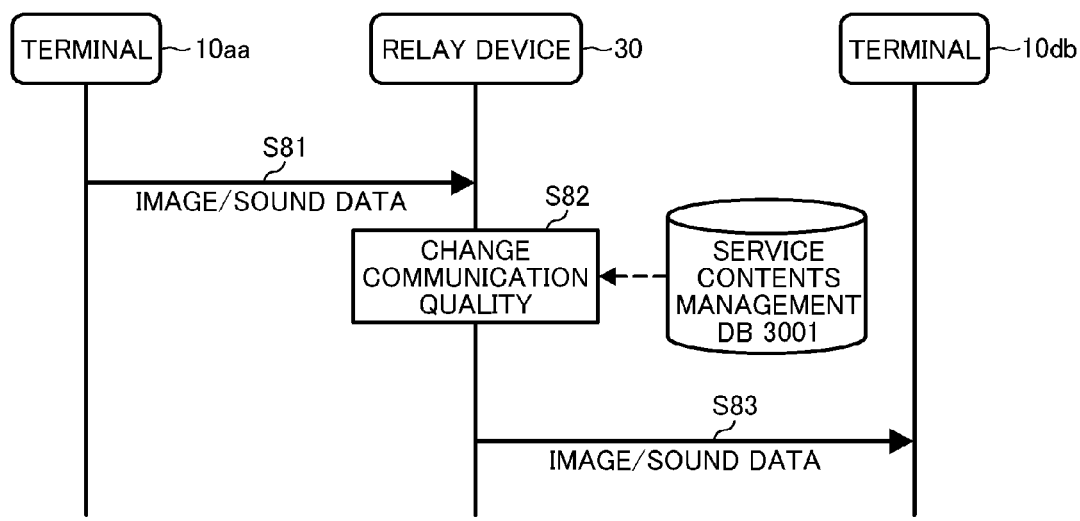
FIG. 20 is a data sequence diagram illustrating operation of carrying out communication between the communication terminals, according to an embodiment of the present invention.

Referring to FIG. 20, operation of carrying out communication between the starting terminal 10*aa* and the counterpart terminal 10*db* is explained according to an embodiment of the present invention. FIG. 20 is a data sequence diagram illustrating operation of carrying out communication between the starting terminal 10*aa* and the counterpart terminal 10*db*. Since the one-way operation of transmitting image data and sound data from the terminal 10*aa* to the terminal 10*db* and the other-way operation of transmitting image data and sound data from the terminal 10*db* to the terminal 10*aa* are the same processing in terms of transmission/reception of image data and sound data, the former-mentioned one-way communication will be described, and the latter-mentioned other-way communication will be omitted.

At the starting terminal 10*aa*, the transmitter/receiver 11 transmits image data of the subject and sound data of sounds, each captured by the communication control 13, to the relay device 30 via the communication network 2, through the communication session having the session ID "sel" (S81).

The transmitter/receiver 31 of the relay device 30 receives the image data and the sound data as content data for transmission to the counterpart terminal 10*db*. The changer 33 changes the quality parameters of the content data (image data and/or sound data), to match the quality parameters as managed by the service contents management table of FIG. 7 (S82). In this case, when the quality of the image data and the quality of the sound data transmitted from the starting terminal 10*aa* are values that are less than or equal to the image quality parameter and the sound quality parameter obtained from the service contents management table of FIG. 7, respectively, the changer 33 does not change the quality of the image data and the quality of the sound data. In contrast, when the quality of the image data transmitted from the starting terminal 10*aa* is a value that exceeds the image quality parameter, the changer 33 reduces the quality of the image data to the value of the image quality parameter. Similarly, when the quality of the sound data transmitted from the starting terminal 10*aa* is a value that exceeds the sound quality parameter, the changer 33 reduces the quality of the sound data to the value of the sound quality parameter.

The transmitter/receiver 31 of the relay device 30 transfers the image data and the sound data to the counterpart terminal 10*db* through the image/sound data session "sed" (S83). Accordingly, the starting terminal 10*aa* can transmit image data and sound data having qualities that are based on the service contents of the starting terminal 10*aa* that sends the communication start request. In the case of transmitting image data and sound data from the counterpart terminal 10*db* to the starting terminal 10*aa* via the relay device 30, image data and sound data having qualities that are based on the service contents of the starting terminal 10*aa* can be transmitted.

In the above-described embodiment, when the user at the terminal 10 requests to change the quality parameters of content data, the management system 50 sends a charge fee and sample data each reflecting the quality change to the terminal 10. The terminal 10 causes the display 120 to display the changed quality parameters, as well as the charge fee and the sample image reflecting the changed quality parameters. That is, the user at the terminal 10 is able to instantly know the new charge fee and preview the sample image. With this information, the user can easily make a decision whether to change the quality parameters, or find out the best service contents (service plan) that matches the current user needs.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, in response to a request for changing at least one quality parameter of content data, the management system 50 may send only a new charge fee to be updated to reflect the change in quality parameter for display at the communication terminal 10. Further, in alternative to changing the communication quality to the higher value, the user may request to change the communication quality to the lower value.

The relay devices 30 and the management system 50 in the above-described embodiment may be configured by a single computer or a plurality of computers to which divided portions (functions) are arbitrarily allocated. In addition, a recording medium such as a CD-ROM storing the terminal control program, the relay device control program, or the communication management program in the above-described embodiment, is used as a program product in case of providing any one of the above programs to users within a certain country or outside that country.

In alternative to the display 120, any other desired display such as a projector or a terminal display may be used.

In addition, although the case of a videoconference terminal has been described as an example of a communication terminal in the above-described embodiment, the embodiment is not limited to this case, and the communication system 1 may be a phone system such as an IP phone system or an Internet phone system. The communication terminal may be any one of a smart phone, a mobile phone, a car navigation terminal, and a wearable computer. The communication terminal further may be any one of a monitoring camera, a digital camera, an electronic blackboard, a projector, a game machine, a digital signage, or industrial equipment with a communication function. A wearable computer includes a watch and a head-mounted display. Industrial equipment includes office equipment such as a multifunction peripheral (MFP) printer product, medical equipment such as an endoscope, and agricultural equipment such as a cultivator.

In addition, although image data and sound data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication terminal, comprising:
processing circuitry that controls a display to display a currently set value of quality parameter of content data to be transmitted from the communication terminal to a counterpart communication terminal;
a transmitter that transmits a request for changing quality parameter from the currently set value to a value selected by a user to a communication management system through a network;
a receiver that receives an updated charge fee to be charged for transmitting content data having the selected value of quality parameter from the communication management system; and
processing circuitry that controls the display to display the updated charge fee.

2. The communication terminal of claim 1, wherein the processing circuitry controls the display to display a screen including the updated charge fee and the selected value of quality parameter of content data.

3. The communication terminal of claim 2, wherein
the receiver further receives sample content data having the selected value of quality parameter from the communication management system, and
the processing circuitry controls the display to display the sample content data on the screen in addition to the updated charge fee and the selected value of quality parameter of content data.

4. The communication terminal of claim 3, wherein the sample content data is video image data.

5. The communication terminal of claim 3, wherein the sample content data is still image data.

6. The communication terminal of claim 3, wherein the sample content data is sound data.

7. The communication terminal of claim 3, wherein the screen further includes a confirmation key to be selected by the user to confirm the request for changing quality parameter to the selected value, and
in response to selection of the confirmation key, content data to be transmitted from the communication terminal to the counterpart communication terminal is caused to have the selected value of quality parameter.

8. A method of controlling display of information through a communication terminal, the method comprising:
displaying a currently set value of quality parameter of content data to be transmitted from the communication terminal to a counterpart communication terminal;
accepting a user input that requests to change quality parameter from the currently set value to a value selected by a user;
receiving an updated charge fee to be charged for transmitting content data having the selected value of quality parameter from a communication management system in response to sending a request for changing the quality parameter; and
displaying the updated charge fee.

9. The method of claim 8, further comprising:
displaying a screen including the updated charge fee and the selected value of quality parameter of content data.

10. The method of claim 9, further comprising:
receiving sample content data having the selected value of quality parameter from the communication management system, and
displaying the sample content data on the screen in addition to the updated charge fee and the selected value of quality parameter of content data.

11. The method of claim 10, wherein the sample content data is video image data.

12. The method of claim 10, wherein the sample content data is still image data.

13. The method of claim 10, wherein the sample content data is sound data.

14. The method of claim 10, further comprising:
displaying a confirmation key to be selected by the user to confirm the request for changing quality parameter to the selected value; and
in response to selection of the confirmation key, causing content data to be transmitted from the communication terminal to the counterpart communication terminal to have the selected value of quality parameter.

15. A non-transitory recording medium which, when executed by one or more processors, cause the processors to perform a method comprising:
displaying a currently set value of quality parameter of content data to be transmitted from the communication terminal to a counterpart communication terminal;

accepting a user input that requests to change quality parameter from the currently set value to a value selected by a user;

receiving an updated charge fee to be charged for transmitting content data having the selected value of quality parameter from a communication management system in response to sending a request for changing the quality parameter; and displaying the updated charge fee.

* * * * *